(12) United States Patent
Satomi et al.

(10) Patent No.: US 6,516,424 B2
(45) Date of Patent: *Feb. 4, 2003

(54) SYSTEM FOR PROVIDING RELIABLE AND EFFECTIVE DISASTER RELIEF

(75) Inventors: Shigeki Satomi, Yokohama (JP); Masaaki Ishikawa, Kawasaki (JP); Taku Seki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/005,332

(22) Filed: Dec. 7, 2001

(65) Prior Publication Data

US 2002/0046369 A1 Apr. 18, 2002

Related U.S. Application Data

(63) Continuation of application No. 09/139,568, filed on Aug. 25, 1998.

(30) Foreign Application Priority Data

Sep. 1, 1997 (JP) .............................................. 9-236078

(51) Int. Cl.⁷ ................................................ G06F 11/00
(52) U.S. Cl. ............................................. 714/4; 714/48
(58) Field of Search ............................. 714/4, 5, 26, 48

(56) References Cited

U.S. PATENT DOCUMENTS

| | | | |
|---|---|---|---|
| 5,185,697 A | | 2/1993 | Jacobs et al. |
| 5,293,556 A | | 3/1994 | Hill et al. |
| 5,499,336 A | * | 3/1996 | Preis et al. .................... 714/4 |
| 5,568,491 A | * | 10/1996 | Beal et al. .................... 714/26 |
| 5,661,668 A | * | 8/1997 | Yemini et al. .............. 702/186 |
| 5,689,233 A | | 11/1997 | Kurisu et al. |
| 6,021,262 A | * | 2/2000 | Cote et al. ................... 709/223 |
| 6,163,856 A | * | 12/2000 | Dion et al. .................. 709/213 |
| 6,170,067 B1 | | 1/2001 | Liu et al. |
| 6,347,384 B1 | * | 2/2002 | Satomi et al. ................. 714/1 |
| 6,401,116 B1 | * | 6/2002 | Okigami ..................... 709/223 |
| 6,446,134 B1 | * | 9/2002 | Nakamura .................. 709/224 |
| 6,477,667 B1 | * | 11/2002 | Levi et al. .................... 714/57 |

FOREIGN PATENT DOCUMENTS

| | | |
|---|---|---|
| JP | 6-131360 | 5/1994 |
| JP | 9-161116 | 6/1997 |
| JP | 9-231170 | 9/1997 |

OTHER PUBLICATIONS

Leehone, THomas. Level II Technical Support in a Distributed Computer Environment, 1997.*

* cited by examiner

Primary Examiner—Robert Beausoliel
Assistant Examiner—Bryce P. Bonzo
(74) Attorney, Agent, or Firm—Mattingly, Stanger & Malur, P.C.

(57) ABSTRACT

When communication networks are damaged or communication is restricted due to the occurrence of a disaster, etc., information required for disaster relief is rapidly and effectively obtained. The system has a plurality of server apparatus 2, a plurality of portable terminal equipment 1, and communication networks 20, 30 of different types to which both the portable terminal equipment 1 and the server apparatus 2 can be connected. The portable terminal equipment 1 accesses an available server apparatus 2 over an available communication network and obtains disaster relief information and resource information corresponding to damaged resources to thereby create or update a disaster relief plan file 5 and a resource information file 6. The server apparatus 2, in response to an inquiry from the portable terminal equipment 1, extracts the necessary information from the disaster relief information DB 3 and the resource information DB 4 and transmits the same to the portable terminal equipment 1.

14 Claims, 5 Drawing Sheets

| ITEM | DEPARTMENT | DAMAGE STATUS | NUMBER OF PERSONS | STARTING DATE | ANTICIPATED NUMBER OF DAYS | KIND OF RESOURCE |
|---|---|---|---|---|---|---|
| ACQUISITION OF BACK-UP DATA | INFORMATION SYSTEM DEPARTMENT COMPUTER OPERATING GROUP | A | 3 PERSONS/ 1 SHIFT 3 SHIFTS | 00/00/00 | 3.5 DAYS | MAGNETIC TAPE MEDIUM |
| | | B | 3 PERSONS/ 1 SHIFT 3 SHIFTS | 00/00/00 | 2.5 DAYS | |
| | | C | 3 PERSONS/ 1 SHIFT 3 SHIFTS | 00/00/00 | 2 DAYS | |
| COUNTER MEASURE FOR FLOOR COLLAPSED | MATERIAL FACILITIES GROUP | A | 8 PERSONS/ 1 SHIFT 2 SHIFTS | 00/00/01 | 20 DAYS | MAGNETIC TAPE MEDIUM, HARD DISK DEVICE |
| | | B | .... | .. | . | |
| | | C | .... | .. | . | |
| ... | .... | . | .... | .. | . | ... |

| ITEM (31) | DEPARTMENT (32) | DAMAGE STATUS (33) | NUMBER OF PERSONS (34) | STARTING DATE (35) | ANTICIPATED NUMBER OF DAYS (36) | KIND OF RESOURCE (37) |
|---|---|---|---|---|---|---|
| ACQUISITION OF BACK-UP DATA | INFORMATION SYSTEM DEPARTMENT COMPUTER OPERATING GROUP | A | 3 PERSONS/ 1 SHIFT 3 SHIFTS | 00/00/00 | 3.5 DAYS | MAGNETIC TAPE MEDIUM |
| | | B | 3 PERSONS/ 1 SHIFT 3 SHIFTS | 00/00/00 | 2.5 DAYS | |
| | | C | 3 PERSONS/ 1 SHIFT 3 SHIFTS | 00/00/00 | 2 DAYS | |
| COUNTER MEASURE FOR FLOOR COLLAPSED | MATERIAL FACILITIES GROUP | A | 8 PERSONS/ 1 SHIFT 2 SHIFTS | 00/00/01 | 20 DAYS | MAGNETIC TAPE MEDIUM, HARD DISK DEVICE |
| | | B | .... | .. | . | |
| | | C | .... | .. | . | |
| ... | .... | . | .... | .. | . | ... |

FIG. 2

| KIND OF RESOURCE ⌐41 | NUMBER POSSESSED ⌐42 | DAMAGE STATUS ⌐43 | UNIT PRICE ⌐44 | REPAIR ROUTE ⌐45 | PURCHASE ROUTE ⌐46 | DELIVERY ⌐47 |
|---|---|---|---|---|---|---|
| MAGNETIC TAPE MEDIUM | 2,113 | | $25,000 | NONE | A COMPANY SALES DEPARTMENT | 1-2 DAYS |
| HARD DISK DEVICE | 15 | | $12,500K | C COMPANY SERVICE CENTER | C COMPANY, COMPUTER SALES DEPARTMENT | 10-14 DAYS |
| ... | ... | ... | ... | ... | ... | ... |

*FIG. 3*

| KIND OF RESOURCE | NUMBER POSS-ESSED | DAMAGE STATUS | UNIT PRICE | REPAIR ROUTE | PURCHASE ROUTE | DELIVERY |
|---|---|---|---|---|---|---|
| MAGNETIC TAPE MEDIUM | 2,113 | B | $25,000 | NONE | A COMPANY, SALES DEPARTMENT | 1-2 DAYS |
| HARD DISK DEVICE | 15 | | NULL | | | |
| ... | ... | ... | ... | | | |

*FIG. 4*

SYSTEM FOR PROVIDING RELIABLE AND EFFECTIVE DISASTER RELIEF

This is a continuation application of U.S. Ser. No. 09/139,568, filed Aug. 25, 1998.

BACKGROUND OF THE INVENTION

The present invention relates to a system for providing reliable and effective relief by computer in the event of a disaster. More specifically, the present invention relates to system for providing disaster relief when a disaster occurs in a widespread area where the communication means available is restricted.

The recent frequent occurrence of earthquakes, such as the Hanshin Great Earthquake, has caused enterprises or organizations which owe certain social duties to start preparing disaster relief plans for distributing necessary materials upon the occurrence of a disaster. Such plans are now in progress. As a prior art technology for dealing with the disaster relief using a computer, for example, Japanese Unexamined Patent Publication JPA-6-131360 discloses a way of determining the number of persons required for dealing with a disaster or an accident depending on the type and magnitude of the disaster. This makes is possible to adequately manage the rapid increases in the number of persons needed and also the status of those persons can be determined.

SUMMARY OF THE INVENTION

When facilities, such as a computer center, are damaged by an accident that has occurred, it is necessary to first collect information about damaged resources before starting making relief plans for restoring these damaged resources to their original state. With such a disaster relief plan, it is helpful if relief dealing information is previously prepared on the assumption of a variety of accident cases, and an actual plan is made based upon a plan selected in response to an actual situation from information previously prepared. However, when the amount of original data needed becomes very great, there is the significant problem of whether or not such data can be collected rapidly when a disaster occurs. In particular, when a damaged resource is located far away from the storage location of the disaster relief dealing information, and a widespread communication network is damaged or communication-regulated, even if the data as to the damaged situation can be collected, adequate information for providing relief cannot be obtained. This sometimes prevents rapid and correct help from being provided.

Accordingly, an object of the present invention is to solve the above-described problem and to provide a system that is capable of rapidly and effectively making and carrying out a plan for dealing with a disaster when it occurs.

According to the present invention, a disaster relief dealing system is provided including a plurality of server apparatus and a plurality of portable terminal equipment. Many types of communication networks are provided to which each of the plurality of server apparatus and the plurality of portable terminal equipment can be connected. Each portable terminal equipment includes means for connecting the terminal equipment to an available server apparatus over an available communication network among the plurality of communication networks, means for transmitting information about damaged resources to the server apparatus, and means for receiving and storing information about a damaged resources relief plan received from the server in a storage. Each server apparatus includes means for storing information about the damaged resources relief plan, and means for transmitting, in response to an inquiry from the portable terminal equipment, information about the damaged resources relief plan to the portable terminal equipment.

Furthermore, it is possible to program the abovedescribed process on the terminal equipment as a computer-program and store it in a readable storage medium.

These and other objects, features and advantages of the present invention will become more apparent in view of the following detailed description of the preferred embodiments of the present invention in conjunction with the drawings.

BRIEF DESCRIPTION OF THE DRAWINGS

FIG. 2 shows a data structure of the disaster relief information database 3 according to an embodiment of the present invention.

FIG. 3 shows a data structure of the resource information database 4 according to an embodiment of the present invention.

FIG. 4 shows a data structure of the resource information file 6 according to an embodiment of the present invention.

DETAILED DESCRIPTION OF THE PREFERRED EMBODIMENTS

Figure 1:
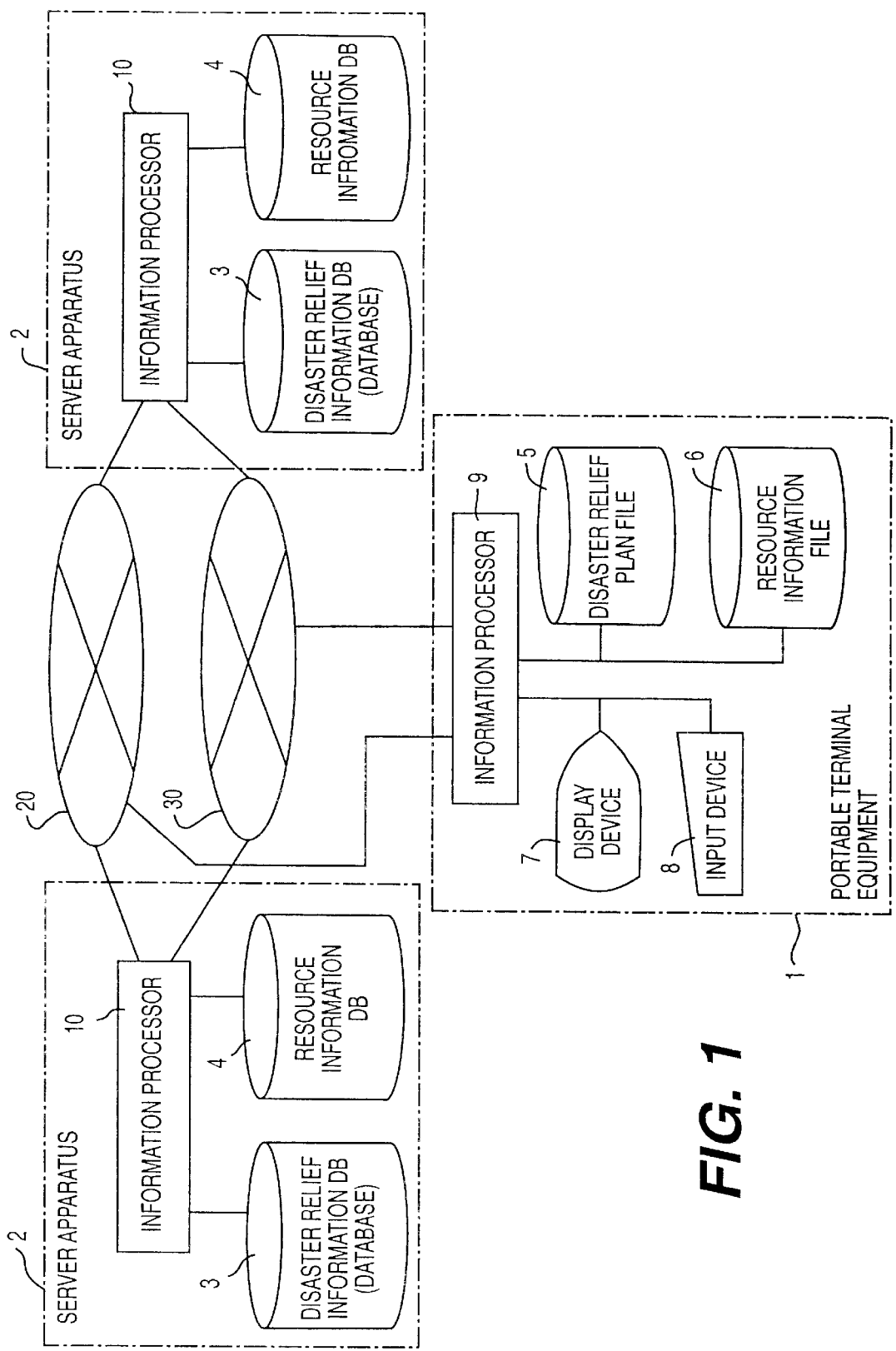
FIG. 1 illustrates a disaster relief system according to an embodiment of the present invention.

FIG. 1 illustrates a disaster dealing system configuration according to an embodiment of the present invention. The system includes a portable terminal equipment 1, a server apparatus 2, and communication networks 20 and 30. The communication networks 20 and 30 include two or more different types of communication networks, such as for example, public communication networks, private communication networks, portable telephone networks, satellite portable telephone networks, ISDN networks, etc. At least two of the server apparatus 2 are spaced geometrically far away from one another. Each of the server apparatus 2 include an information processor 10, a disaster relief information database (DB) 3, and a resource information DB 4. The information processor 10 is an information processing apparatus such as a personal computer, a workstation, etc., and is provided with a modem through which connection to a public network and a private network is enabled. A terminal adapter is provided with a portable telephone network attachment unit, a satellite portable telephone network attachment unit, an ISDN network attachment unit, the Internet, etc., to permit connection to a plurality of types of communication networks such as communication networks 20 and 30.

The portable terminal equipment 1 may contain a predefined priority of communication networks over which to reach a desired server. The user can select from these various networks. Also, in order to ensure security, various methods can be employed. For example, in the case of an ISDN network, the user may have to provide the server address while the network sends the user's phone number and sub-address. In the case of the Internet, the MAC address of the user can be used for security, since it is hardware stored in ROM. IP address alone may not suffice. In the case of a public phone network, the network sends the user's phone number and the user can be required to enter some password.

The disaster relief information DB 3 is a database for storing the information about a relief plan for the disaster. When facilities such as a computer center, not shown, are damaged by the occurrence of a widespread disaster, the resource information DB 4 stores information about routes for making arrangements for relief of the damaged facilities. The portable terminal equipment 1 includes an information processor 9, a disaster relief plan file 5, a resource information file 6, a display device 7, and an input device 8. The information processor 9 can be a personal computer, a portable information terminal, and has a modem through which connection to a public network and a private network is enabled. A terminal adapter is provided with a portable telephone network attachment unit, a satellite portable telephone network attachment unit, an ISDN network attachment unit, etc., to permit connection to a plurality of types of a communication networks such as communication networks 20 and 30. The disaster relief plan file 5, which is a file for dealing with damaged resources only from among the items contained in the disaster relief information DB 3, is used for making disaster relief plans. The resource information file 6 is a file having information about routes for damaged resources from among the resource information in the resource information DB 4 and is used for making arrangements for resources. The display device 7 displays a menu such as kinds of resources. The input device 8 can be, for example, a keyboard, a mouse, a pen, a touch panel, etc., and is used to select certain kinds of resources, etc., from the menu displayed on the display device 7.

The portable terminal equipment 1 is a terminal device that is initially set-up in a disaster relief head office and transported to a damaged computer center for investigating the status of resources that have been damaged. The portable terminal equipment 1 connects to any one of the plurality of server apparatus 2 over an available network selected from a plurality of networks such as communication networks 20 or 30. A menu is displayed on display device 7 to show information about the various kinds of resources and corresponding disaster situations thereof. Then, the kind of resource and its damage status is input by the input device 8. Once this is done, the portable terminal equipment 1 transmits this information that has been input to the connected server apparatus 2 to obtain disaster relief information and resource information. The server apparatus 2 refers to the disaster relief information DB 3 and the resource information 4 and fetches and transmits to the portable terminal equipment the required disaster relief information and the resource information required. The portable terminal equipment 1 receives and stores this transmitted information in the disaster relief plan file 5 and the resource information file 6. It should be understood that the computer program for performing the process described above may be stored in a storage medium for execution by both the information processor 9 and the information processor 10 after being read from the external storage device of the portable terminal equipment 1 and the server apparatus 2.

FIG. 2 shows the data structure of the disaster relief information database DB 3 according to an embodiment of the present invention. The disaster relief information DB 3 is produced according to standards for dealing with disasters of a given enterprise or organization. Under the heading of Item 31 is a list of all items that are to be dealt with in the event of a disaster. Under the heading Department 32 is a list of various departments which are responsible for providing disaster relief for the corresponding Item 31. The heading Kind of Resource 37 corresponds to the various resources related to the particular Item 31. Damage Status 33 lists different degrees of damage to each Item 31. For each Item 31, the Number of Persons 34 needed for providing relief, a Starting Date 35, and an Anticipated Number of Days 36 for each Damage Status 33 are set.

FIG. 3 shows the data structure of the resource information DB 4 according to an embodiment of the present invention. A resource likely to be damaged is specified under the heading Kind of Resource 41. The number of such resources possessed is specified in the heading Number Possessed 42. The heading Damage Status 43 lists various levels of classified damages and stores the information transmitted from a portable terminal equipment 1. In the same manner, Unit Price 44, Repair Route 45, Purchase Route 46, and Delivery 47 show the unit price of the resource, where to submit the resource, where to purchase the resource, and the number of days required for repair and purchase of the resource, respectively.

The disaster relief plan file 5 is prepared as follows. The data structure includes an Item 31 to be dealt with and a Department 32 for dealing with the relief of that Item 31 as selected by the Kind of Resource 37 from the disaster relief information DB 3. The disaster relief plan file 5 further includes the Number of Persons 34 required for providing relief, the Starting Date 35, and the Anticipated Number of Days 36 according to the Damage Status 33.

FIG. 4 shows the data structure of the resource information file 6 according to an embodiment of the present invention. The resource information file 6 includes a heading Kind of Resource 41 and a heading Number Possessed 42 in the same manner as the resource information DB 4. Resource information file 6 also contains the Damage Status 43 for each Kind of Resource 41. Headings Unit Price 44, Repair Route 45, Purchase Route 46, and Delivery 47 of the resource information DB 4 are included in the information stored only for items under Kind of Resource 41 that are selected according to a process to be described later.

Figure 5:
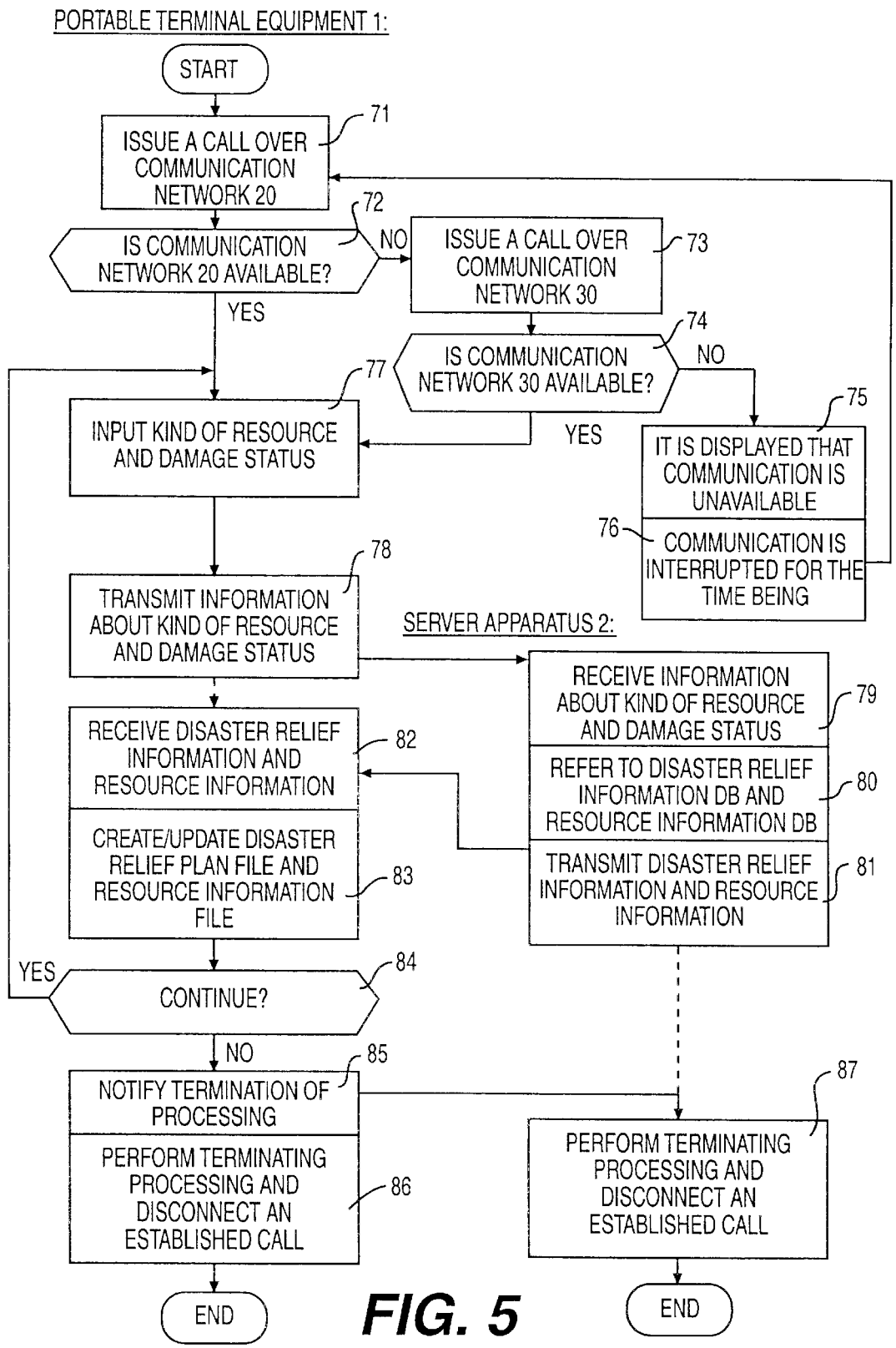
FIG. 5 is a flowchart showing the steps carried out by a portable terminal equipment 1 and a server apparatus 2 according to an embodiment of the present invention.

FIG. 5 is a flowchart illustrating the process steps carried out by the application program portion stored in the main storage of the information processor 9 of the portable terminal equipment 1 and the information processor 10 of the server apparatus 2. The portable terminal equipment 1 issues a call to any of the server apparatus 2 over a communication network 20 (step 71). If the communication network 20 is available (YES in step 72) and a call can be established between the portable terminal equipment 1 and the server apparatus 20, the process proceeds to step 77. If the communication network 20 is available, but a call cannot be established with the selected server apparatus 2, the processing proceeds to step 77 after issuing a call to another server apparatus 2 over the communication network 20. If the communication network 20 is unavailable (NO in step 72), a call is issued to a server apparatus 2 over a communication network 30 (step 73). If the communication network 30 is available (YES in step 74) and a call can be established with the server apparatus 2, the processing proceeds to Step 77. When the communication network 30 is available, but a call cannot be established with the selected server apparatus 2, after issuing a call to use another server apparatus via communication network 30, the processing proceeds to step 77. When the communication network 30 is unavailable (NO in Step 74), if there are other communication networks available, steps 73 and 74 are repeated for these other communication networks. When all alternate available communication networks have been tried unsuccessfully, it is displayed on the display device 7 that communication is unavailable (step 75) and the communication is interrupted for the time being (step 76). Then, the above process is repeated by returning back to step 71.

When a communication network becomes available and a call is established with a server apparatus 2, the information processor 9 displays the various kinds of resources 41 on the display device 7 by referring to the resource information file 6. The kind of resource and its damage status are received by way of an input device 8 (step 77). All candidates for the heading Kind of Resource 41 are displayed on the display device 7 as a menu. When any one of the items listed under the heading Kind of Resource 41 is selected through the input device 8, possibilities for damage status 43 corresponding to that kind of resource is displayed on the display device 7 as a pull-down menu for selection. When the Kind of Resource 41 and corresponding Damage Status 43 have been selected, the inputted Damage Status 43 is set as the Damage Status 43 of the resource information file 6 and the inputted Kind of Resource 41 and its Damage Status 43 are transmitted to the server apparatus 2 over an available communication network (step 78).

An information processor 10 of the server apparatus 2 receives this information (step 79). Then, the processor 10 obtains information corresponding to the Kind of Resource 41 (Kind of Resource 37), Damage Status 43 (Damage Status 33), and resource information received (step 80), and transmits the same to the portable terminal equipment 1 (step 81). The information processor 9 of the portable terminal equipment 1 receives this information (step 82), and then creates or updates the disaster relief plan file 5 and resource information file 6 (step 83). That is, the obtained disaster relief information is stored in the disaster relief plan file 5 and a unit price 44, a repair route 45, a purchase route 46, and delivery 47 are added by linking from the corresponding damage status 43 of the kind of resource 41 in the resource information file 6. When continuation of the process is directed through the input device 8 (YES in step 84), the process returns back to step 77 to repeat the process described above for a different kind of resource. When termination of the process is directed through the input device 8 (NO in step 84), the server apparatus 2 (step 85) is so informed to terminate the process and disconnect the established call (steps 86 and 87). Note that, although in the embodiment described above, a call is issued from a portable terminal equipment 1, a possible alternative is to have the call be issued from a server apparatus 2 to a portable terminal equipment 1.

After a disaster relief plan file 5 and a resource information file 6 of the portable terminal equipment 1 are created as described above, the portable terminal equipment 1 is brought back to the disaster relief head office. In the disaster relief head office, the starting date 35 of the disaster relief plan file 5 is corrected to match a real date and another starting date 35 of the disaster relief plan file 5 and the resource information file 6 are corrected to match a real date. The disaster relief file 5 thus created becomes a process plan for providing disaster relief, thereby enabling it to be displayed on the display device in the form of a process chart. This allows disaster relief to follow in a controlled manner. In addition, repair and purchase of resources can be arranged on the basis of the resource information file 6.

In the embodiment described above, although the Kind of Resource 41, the Number Possessed 42, and Damage Status 43 are previously stored in a resource information file 6, it also can be devised that this information is obtained from a resource information DB 4 of the server apparatus 2.

As explained above, according to the present invention, in addition to providing a plurality of server apparatus, redundancy is provided with communication means between a terminal equipment and a server apparatus, thus a terminal equipment can more reliably access the disaster relief dealing information and resource information. Furthermore, information which corresponds to the actual status of the damage can be selected from a disaster relief information database and a resource information database which have been created by assuming a variety of disaster cases. This way, a disaster plan can be more effectively and more rapidly carried out.

While the present invention has been described above in connection with the preferred embodiments, one of ordinary skill in the art would be enabled by this disclosure to make various modifications to these embodiments and still be within the scope and spirit of the present invention as recited in the appended claims.

What is claimed is:

1. A system having a plurality of server apparatus, a plurality of portable terminal equipment and a plurality of types of communication networks to which each of the plurality of server apparatus and the plurality of portable terminal equipment can be connected, wherein each of said plurality of portable terminal equipment comprises:

a connector which connects the portable terminal equipment to an available one of the plurality of server apparatus over an available one of the plurality of types of communication networks;

a first transmitter which transmits information about damaged resources to the server apparatus; and a receiver which receives and stores information about a relief plan received from the server apparatus in a storage; and wherein each of said plurality of server apparatus comprises:

a storage which stores information about the relief plan;

a second transmitter which, in response to an inquiry from one of said plurality of portable terminal equipment, transmits information about the relief plan to said one of said plurality of portable terminal equipment;

wherein each of said server apparatus refers to a disaster relief information database and a resource information database to obtain information about the relief plan in response to an inquiry from one of said plurality of portable terminal equipment; and wherein the disaster relief information database includes a list of items that are to be dealt with, a department that is in charge of dealing with each item, and at least one damage status for each item.

2. A system having a plurality of server apparatus, a plurality of portable terminal equipment and a plurality of types of communication networks to which each of the plurality of server apparatus and the plurality of portable terminal equipment can be connected, wherein each of said plurality of portable terminal equipment comprises:

a connector which connects the portable terminal equipment to an available one of the plurality of server apparatus over an available one of the plurality of types of communication networks;

a first transmitter which transmits information about damaged resources to the server apparatus; and a receiver which receives and stores information about a relief plan received from the server apparatus in a storage; and wherein each of said plurality of server apparatus comprises:

a storage which stores information about the relief plan;

a second transmitter which, in response to an inquiry from one of said plurality of portable terminal equipment, transmits information about the relief plan to said one of said plurality of portable terminal equipment;

wherein each of said server apparatus refers to a disaster relief information database and a resource information database to obtain information about the relief plan in response to an inquiry from one of said plurality of portable terminal equipment; and wherein the resource information database includes a list of resources that are likely to be damaged, a number indicating how many of each resource are possessed and when and how the resource can be repaired.

3. A system according to claim 1, wherein the resource information database includes a list of resources that are likely to be damaged, a number indicating how many of each resource are possessed and when and how the resource can be repaired.

4. A system having a plurality of server apparatus, a plurality of portable terminal equipment and a plurality of types of communication networks to which each of the plurality of server apparatus and the plurality of portable terminal equipment can be connected, wherein each of said plurality of portable terminal equipment comprises:

a connector which connects the portable terminal equipment to an available one of the plurality of server apparatus over an available one of the plurality of types of communication networks;

a first transmitter which transmits information about damaged resources to the server apparatus; and a receiver which receives and stores information about a relief plan received from the server apparatus in a storage; and wherein each of said plurality of server apparatus comprises:
a storage which stores information about the relief plan; and
a second transmitter which, in response to an inquiry from one of said plurality of portable terminal equipment, transmits information about the relief plan to said one of said plurality of portable terminal equipment;
wherein the relief plan received by the portable terminal equipment is incorporated into its own disaster relief plan file and resource information file.

5. A system according to claim 4, wherein the disaster relief plan file includes information about each resource that is damaged in terms of which department is responsible for providing relief, a number of persons needed, and an amount of time needed.

6. A system according to claim 4, wherein the resource information file includes information about each resource that is damaged in terms of how many of each resource that is damaged are possessed and when and how each such resource can be repaired.

7. A system according to claim 5, wherein the resource information file includes information about each resource that is damaged in terms of how many of each resource that is damaged are possessed and when and how each such resource can be repaired.

8. In a system having a plurality of server apparatus, a plurality of portable terminal equipment and a plurality of types of communication networks to which each of the plurality of server apparatus and the plurality of portable terminal equipment can be connected, a method comprising the steps of:

connecting the portable terminal equipment to an available one of the plurality of server apparatus over an available one of the plurality of types of communication networks;

transmitting information about damaged resources to the server apparatus;

receiving and storing information about a relief plan received from the server apparatus in a storage;

storing information about the relief plan; and transmitting, in response to an inquiry from one of said plurality of portable terminal equipment, information about the relief plan to said one of said plurality of portable terminal equipment;

wherein each of said server apparatus refers to a disaster relief information database and a resource information database to obtain information about the relief plan in response to an inquiry from one of said plurality of portable terminal equipment; and wherein the disaster relief information database includes a list of items that are to be dealt with, a department that is in charge of dealing with each item, and at least one damage status for each item.

9. In a system having a plurality of server apparatus, a plurality of portable terminal equipment and a plurality of types of communication networks to which each of the plurality of server apparatus and the plurality of portable terminal equipment can be connected, a method comprising the steps of:

connecting the portable terminal equipment to an available one of the plurality of server apparatus over an available one of the plurality of types of communication networks;

transmitting information about damaged resources to the server apparatus;

receiving and storing information about a relief plan received from the server apparatus in a storage;

storing information about the relief plan; and transmitting, in response to an inquiry from one of said plurality of portable terminal equipment, information about the relief plan to said one of said plurality of portable terminal equipment;

wherein each of said server apparatus refers to a disaster relief information database and a resource information database to obtain information about the relief plan in response to an inquiry from one of said plurality of portable terminal equipment; and wherein the resource information database includes a list of resources that are likely to be damaged, a number indicating how many of each resource are possessed and when and how the resource can be repaired.

10. The method according to claim 8, wherein the resource information database includes a list of resources that are likely to be damaged, a number indicating how many of each resource are possessed and when and how the resource can be repaired.

11. In a system having a plurality of server apparatus, a plurality of portable terminal equipment and a plurality of types of communication networks to which each of the plurality of server apparatus and the plurality of portable terminal equipment can be connected, a method comprising the steps of:

connecting the portable terminal equipment to an available one of the plurality of server apparatus over an available one of the plurality of types of communication networks;

transmitting information about damaged resources to the server apparatus;

receiving and storing information about a relief plan received from the server apparatus in a storage;

storing information about the relief plan; and transmitting, in response to an inquiry from one of said plurality of portable terminal equipment, information about the relief plan to said one of said plurality of portable terminal equipment;

wherein the relief plan received by the portable terminal equipment is incorporated into its own disaster relief plan file and resource information file.

12. The method according to claim 11, wherein the disaster relief plan file includes information about each resource that is damaged in terms of which department is responsible for providing relief, a number of persons needed, and an amount of time needed.

13. The method according to claim 11, wherein the resource information file includes information about each resource that is damaged in terms of how many of each resource that is damaged are possessed and when and how each such resource can be repaired.

14. The method according to claim 12, wherein the resource information file includes information about each resource that is damaged in terms of how many of each resource that is damaged are possessed and when and how each such resource can be repaired.

* * * * *